(12) United States Patent
Kolda et al.

(10) Patent No.: US 6,931,884 B2
(45) Date of Patent: Aug. 23, 2005

(54) UNDERMOUNT TRANSPORT TEMPERATURE CONTROL UNIT

(75) Inventors: Michal Kolda, Prague (CZ); Petr Prochazka, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 16 days.

(21) Appl. No.: 10/472,716

(22) PCT Filed: Mar. 27, 2001

(86) PCT No.: PCT/US01/09751

§ 371 (c)(1),
(2), (4) Date: Sep. 19, 2003

(87) PCT Pub. No.: WO02/077551

PCT Pub. Date: Oct. 3, 2002

(65) Prior Publication Data

US 2004/0134227 A1 Jul. 15, 2004

(51) Int. Cl.[7] .................. F25D 19/00; F25D 23/00; B60H 1/32
(52) U.S. Cl. .............. 62/449; 62/450; 62/302; 62/239
(58) Field of Search .............. 62/448, 239, 455, 62/298, 449, 450, 302, 428

(56) References Cited

U.S. PATENT DOCUMENTS

| | | | |
|---|---|---|---|
| 2,099,747 A | 1/1937 | Melcher | |
| 2,663,163 A | * 12/1953 | Mansmann | 62/239 |
| 2,867,992 A | 1/1959 | McGuffey | |
| 2,902,837 A | * 9/1959 | Willis et al. | 62/239 |
| 2,948,498 A | 8/1960 | Johnsen et al. | |
| 3,411,569 A | 11/1968 | Hildreth | |
| 4,249,389 A | 2/1981 | Mayer | |
| 4,257,240 A | 3/1981 | Christiansen et al. | |
| 4,292,661 A | 9/1981 | Johnson et al. | |
| 4,748,825 A | 6/1988 | King | |
| 4,811,569 A | 3/1989 | Welch et al. | |
| 4,888,959 A | 12/1989 | Brown | |
| 4,918,932 A | 4/1990 | Gustafson et al. | |
| 5,065,587 A | 11/1991 | Howland et al. | |
| 5,103,783 A | 4/1992 | Hanson et al. | |
| 5,123,251 A | 6/1992 | Hanson | |
| 5,123,252 A | 6/1992 | Hanson | |
| 5,123,253 A | 6/1992 | Hanson et al. | |
| 5,129,235 A | 7/1992 | Renken et al. | |
| 5,140,825 A | 8/1992 | Hanson et al. | |
| 5,140,826 A | 8/1992 | Hanson et al. | |
| 5,152,152 A | 10/1992 | Brickner et al. | |
| 5,161,383 A | 11/1992 | Hanson et al. | |
| 5,161,384 A | 11/1992 | Hanson et al. | |
| 5,172,561 A | 12/1992 | Hanson et al. | |
| 5,186,015 A | 2/1993 | Roehrich et al. | |
| 5,201,185 A | 4/1993 | Hanson et al. | |
| 5,201,186 A | 4/1993 | Hanson | |
| 5,222,368 A | 6/1993 | Hanson | |
| 5,226,294 A | 7/1993 | Mayer | |
| 5,284,024 A | 2/1994 | Hanson et al. | |

(Continued)

Primary Examiner—William C. Doerrler
(74) Attorney, Agent, or Firm—Michael Best & Friedrich LLP

(57) ABSTRACT

A condenser module for a temperature control unit (14) of a transport vehicle (10). The condenser module includes a frame (70) defining an interior space (72) and a substantially U-shaped condenser coil (166) supported by the frame in the interior space. The condenser module also includes a control box (150) for providing electric power to the unit. The control box (150) is movably coupled to the frame (70) and is movable between a first position, where the control box is inside the frame and positioned for operation of the temperature control unit and a second position, where the control box is at least partially outside the frame and positioned to grant access to the interior space of the frame.

28 Claims, 10 Drawing Sheets

U.S. PATENT DOCUMENTS

| | | |
|---|---|---|
| 5,291,745 A | 3/1994 | Hanson |
| 5,295,364 A | 3/1994 | Truckenbrod et al. |
| 5,303,560 A | 4/1994 | Hanson et al. |
| 5,369,957 A | 12/1994 | Hanson |
| 5,377,493 A | 1/1995 | Friedland |
| 5,423,190 A | 6/1995 | Friedland |
| 5,454,229 A | 10/1995 | Hanson et al. |
| 5,456,088 A | 10/1995 | Hanson et al. |
| 5,557,938 A | 9/1996 | Hanson et al. |
| 5,557,941 A | 9/1996 | Hanson et al. |
| 5,572,879 A | 11/1996 | Harrington et al. |
| 5,579,648 A | 12/1996 | Hanson et al. |
| 5,596,878 A | 1/1997 | Hanson et al. |
| 5,685,166 A * | 11/1997 | Li .................. 62/428 |
| 5,960,637 A | 10/1999 | Stevens et al. |
| 6,037,864 A | 3/2000 | Sem et al. |
| 6,158,794 A | 12/2000 | Flanagan |
| 6,357,248 B1 | 3/2002 | Bongaards et al. |

* cited by examiner

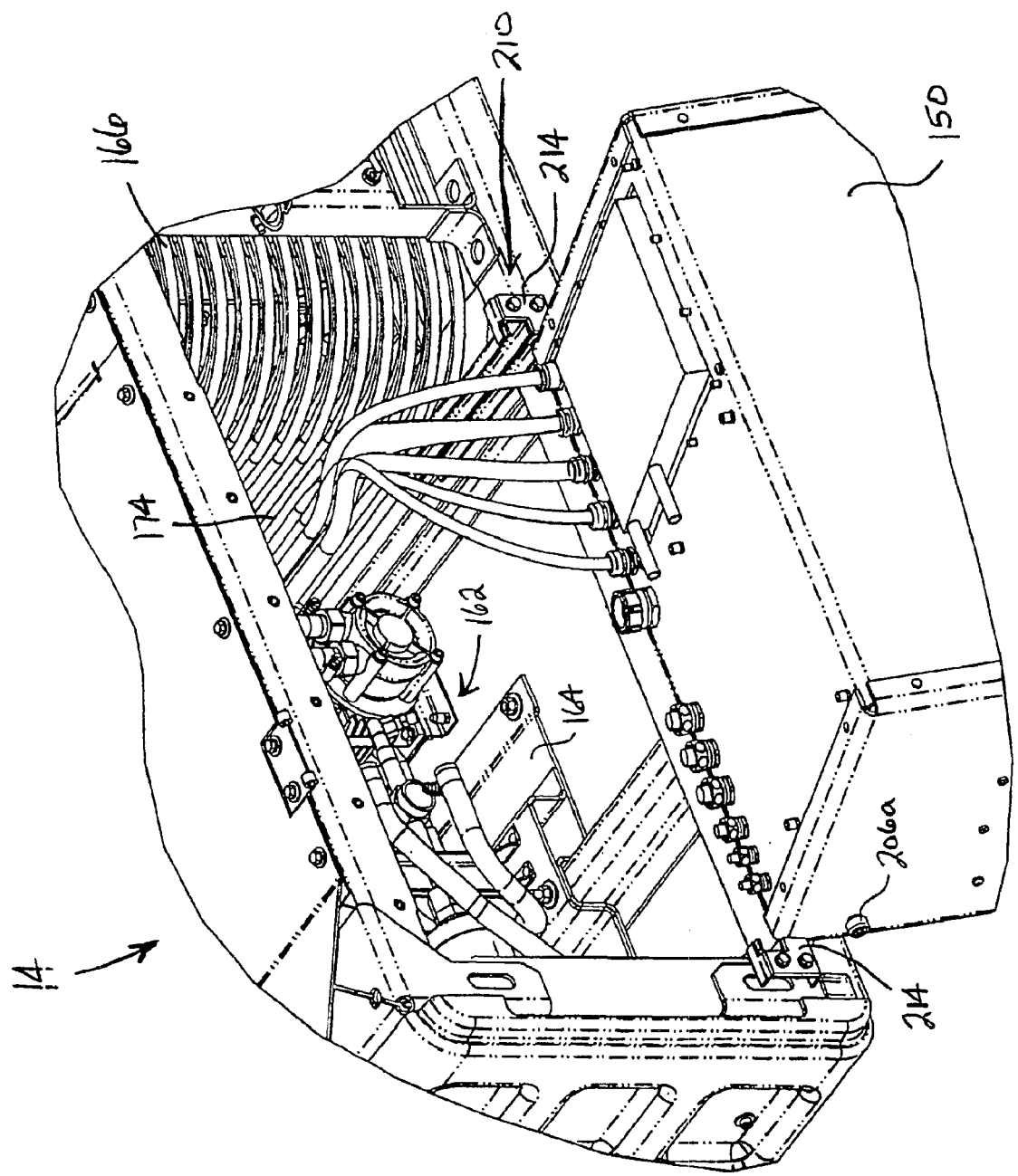

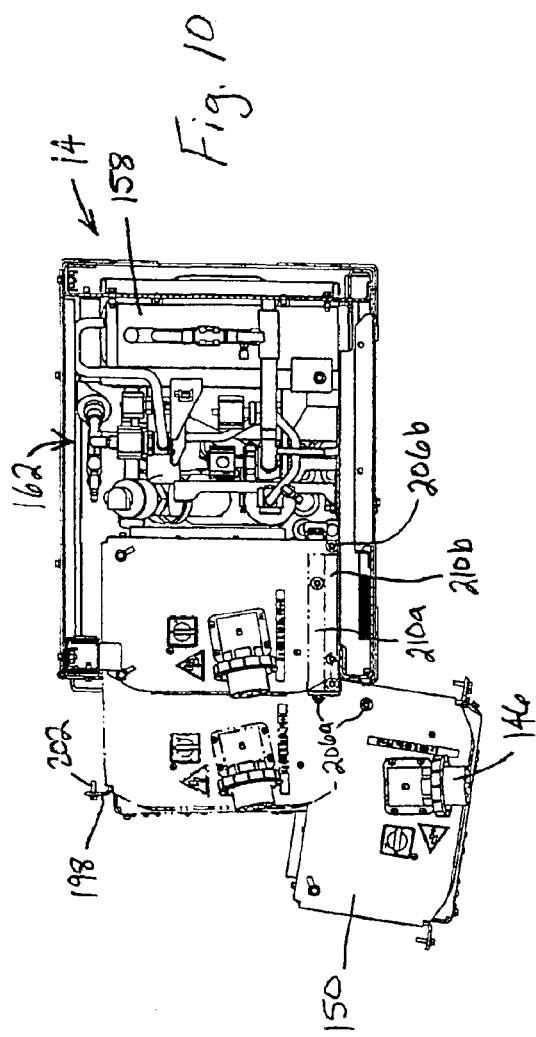
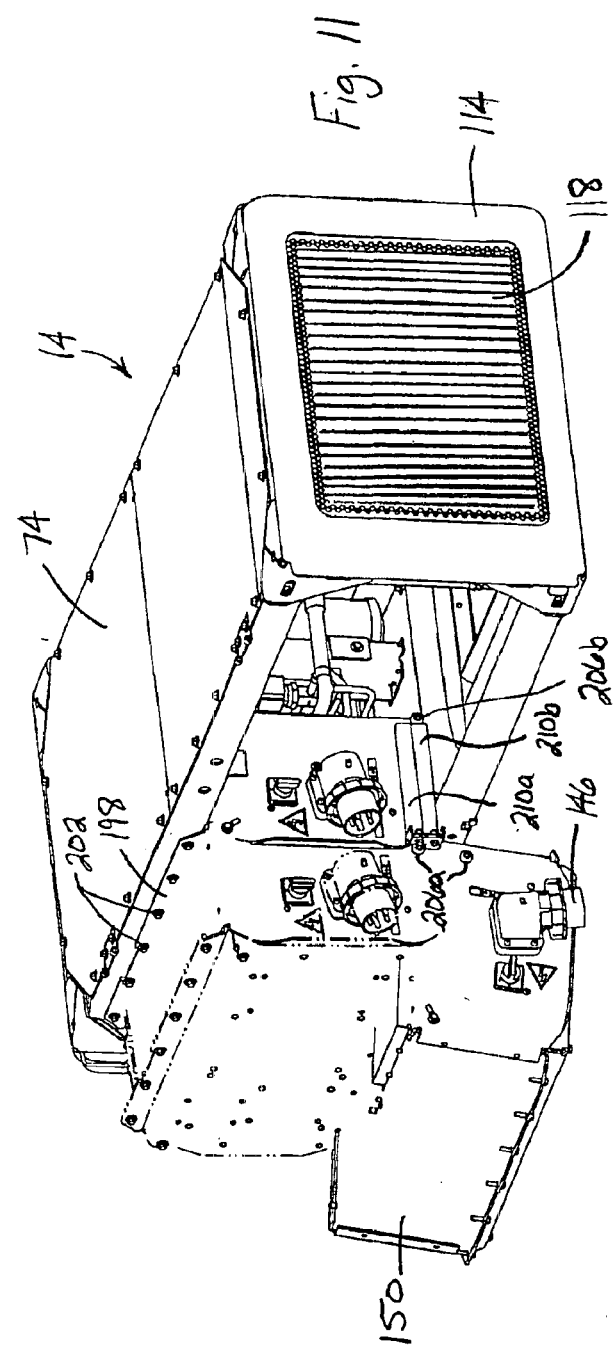

UNDERMOUNT TRANSPORT TEMPERATURE CONTROL UNIT

FIELD OF THE INVENTION

The invention relates to transport temperature control units, and more particularly to undermount transport temperature control units for trucks or trailers.

BACKGROUND OF THE INVENTION

Straight trucks and tractor-trailers (hereinafter referred to as "vehicles") frequently transport cargo that must be maintained at a predetermined temperature during transportation in order to preserve the quality of the cargo. Vehicles that transport such temperature-sensitive cargo have a conditioned space that is maintained at a predetermined temperature by a temperature control unit mounted to the vehicle at a location either on the front of the cargo box or underneath the cargo box. These temperature control units are respectively referred to as nosemount and undermount transport temperature control units.

Undermount units are used when vehicle tilt cab clearance cannot be provided by a nosemount unit, when a nosemount unit cannot be provided for a drawbar trailer, or when the weight of a nosemount unit causes the vehicle to become unstable. Some countries, including Japan, have specific regulations mandating the use of undermount temperature control units under certain circumstances.

An undermount temperature control unit has three basic parts—a condenser module located underneath the cargo box, an evaporator module located inside the cargo box, and an installation kit that connects these modules. When the undermount temperature control unit is electrically powered, it also has a fourth part—an auxiliary alternator located in the vehicle's engine compartment. The auxiliary alternator is connected to a control box that is typically housed in the condenser module.

SUMMARY OF THE INVENTION

This invention is directed to condenser module of an undermount temperature control unit. Those skilled in the art commonly use the terms "condenser module" and "undermount temperature control unit" interchangeably when referring to the portion of the unit mounted underneath the cargo box. Therefore, unless otherwise specified below, the term undermount temperature control unit and condenser module will be used interchangeably.

Prior-art undermount temperature control units suffer from various disadvantages. First, typical undermount temperature control units are quite large, making them difficult to install in light of the space constraints underneath the vehicle created by fuel tanks, battery boxes, and the like. The relatively high weight of the undermount units also adds to the installation difficulties.

Once installed, typical undermount temperature control units are usually difficult to service due to the restricted access caused by the fuel tanks, battery boxes, and other equipment mounted underneath the vehicle. The layout and design of the components inside the unit also makes servicing some of the interior components difficult. For example, the numerous belts and pulleys on the diesel engine make accessing adjacent components extremely difficult. The frequency at which servicing is needed is also relatively high due to inadequate debris screening by the unit's housing.

While operating, typical undermount units are relatively loud and experience high levels of vibration, due largely to the components used in the unit. The three largest noise and vibration contributors are the diesel engine, the piston-type compressor, and the condenser fans commonly used in typical undermount units.

Typical undermount units are also known to have obstructed condenser air discharge pathways, often resulting in reduced capacity and efficiency of the unit. This reduced efficiency adds to the already high fuel consumption of the diesel engine. The air discharge pathways are often obstructed by the vehicle frame. The obstructions often divert the discharge air toward the ground, resulting in the blowing of dust and debris that can collect inside the unit. This dust and debris collection adds to the servicing problems described above.

It is therefore desirable to design an undermount temperature control unit having features that reduce the size and weight of the unit, that improve serviceability of the unit, that reduce noise and vibration of the unit, that provide improved condenser air discharge, and that reduce fuel consumption. The present invention provides such an improved undermount temperature control unit.

More specifically, the invention provides a condenser module for an electric temperature control unit for a transport vehicle. The condenser module includes a frame defining an interior space and having a first side and a second side opposite the first side. The condenser module also includes an access panel movably coupled to the first side of the frame for granting access to the interior space. A compressor is supported by the frame in the interior space. A refrigerant routing system communicates with the compressor and is also supported by the frame in the interior space. Additionally, a substantially U-shaped condenser coil is supported by the frame in the interior space and communicates with the refrigerant routing system.

In one aspect of the invention, the U-shaped condenser coil includes a base portion adjacent the first side of the frame, and first and second arm portions extending toward the second side of the frame. The base portion and the arm portions together define a second interior space within the interior space defined by the frame. An air displacement device is housed in the second interior space for moving air through the second interior space. The air displacement device is preferably an electrically-powered radial blower.

In another aspect of the invention, the condenser module includes a control box adjacent the first side for providing electric power to the unit. The control box is movably coupled to the frame and is movable between a first position, where the control box is inside the interior space and positioned for operation of the temperature control unit, and a second position, where the control box is at least partially outside the interior space and positioned to grant access to the refrigerant routing system and the compressor from the first side of the frame.

In yet another aspect of the invention, the compressor and the refrigerant system are both mounted on a single platform such that the compressor and the refrigerant routing system together define a single modular assembly that can be inserted or removed as a unit.

The invention also provides a method of gaining access to components housed in an interior space of a condenser module of a temperature control unit. The condenser module includes a frame with first and second sides, and a control box movably coupled to the frame adjacent the first side. The components include a compressor supported by the frame in the interior space adjacent the second side and a refrigerant routing system communicating with the compressor and supported by the frame in the interior space adjacent the second side.

The method includes moving the control box from a first position, where the control box is inside the interior space and positioned for operation of the temperature control unit, to a second position, where the control box is at least partially outside the interior space and positioned to allow access to the refrigerant routing system and the compressor from the first side of the frame. In one aspect of the invention, moving the control box includes rolling the control box out of the interior space and subsequently pivoting the control box so that at least a portion of the control box moves away from the first side of the frame.

Other features and advantages of the invention will become apparent to those skilled in the art upon review of the following detailed description, claims, and drawings.

BRIEF DESCRIPTION OF THE DRAWINGS

FIG. 9 is an enlarged perspective view showing the control box partially removed from the unit.

FIGS. 10 and 11 show the steps for removing the control box from the undermount temperature control unit.

Figure 1:
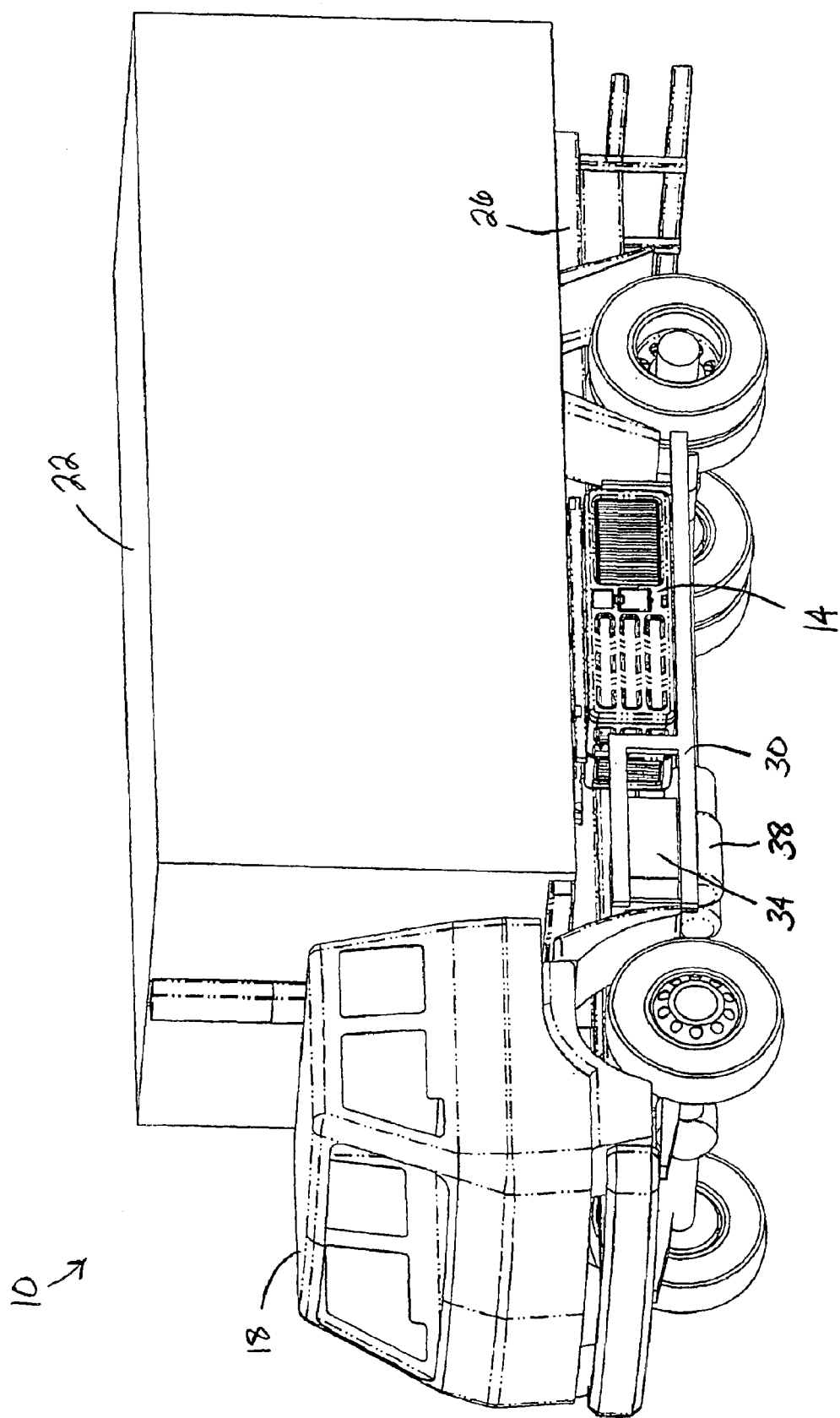
FIG. 1 is a perspective view of a vehicle having an undermount temperature control unit embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a vehicle 10 having an undermount temperature control unit 14 embodying the invention. In the illustrated embodiment, the vehicle 10 is a straight-truck having a cab 18 and a conditioned cargo box 22. The cab 18 and the cargo box 22 are supported by a frame 26. Guard rails 30 are coupled to the frame 26 to protect various components of the vehicle 10, including a battery box 34, an exhaust system 38, and a fuel tank (not shown). The vehicle 10 need not be a straight-truck, but could alternatively be a tractor-trailer or any other vehicle used to transport cargo stored in a conditioned airspace.

Figure 2:
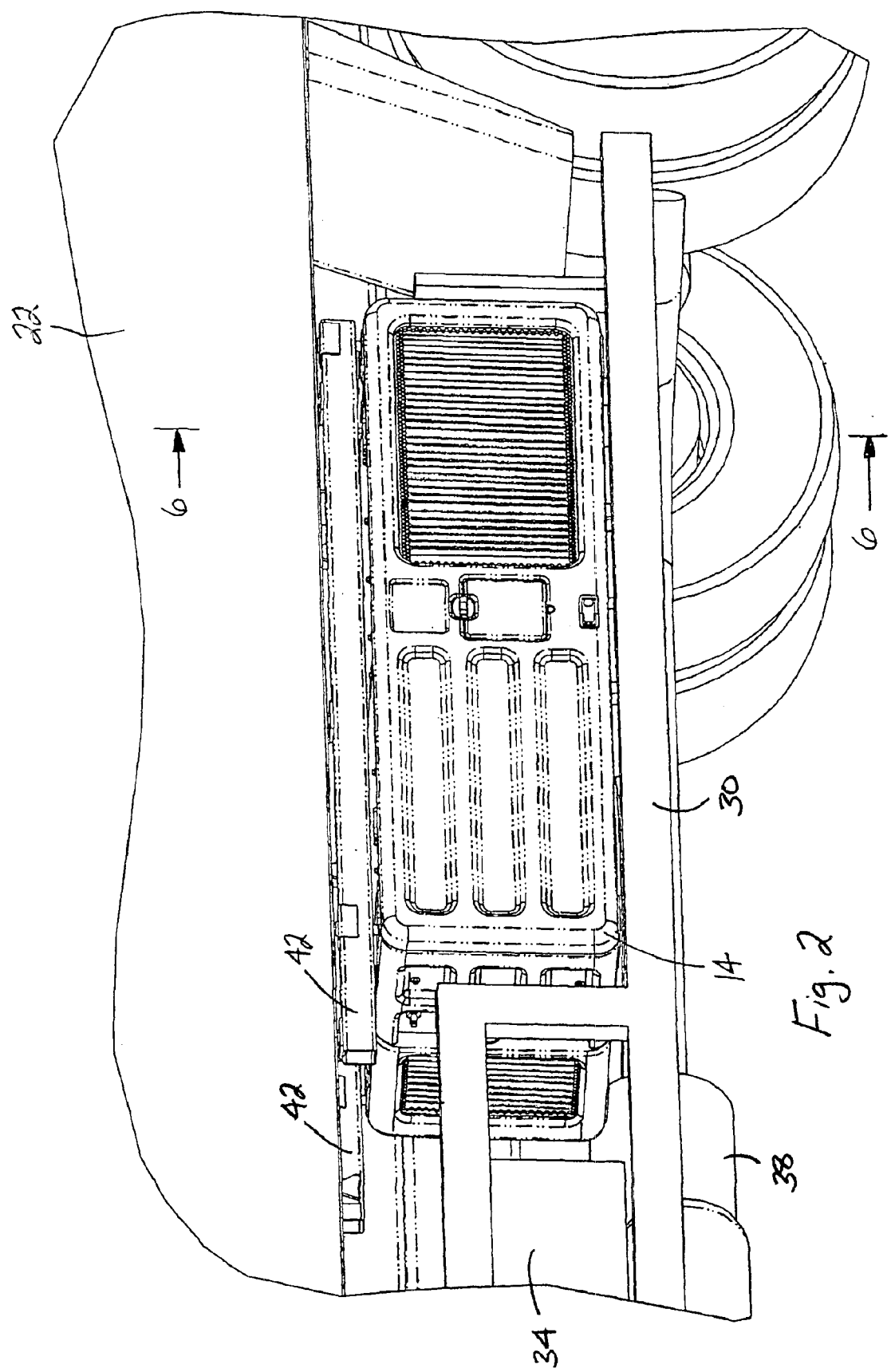
FIG. 2 is an enlarged perspective view of the undermount temperature control unit of FIG. 1.
Figure 6:
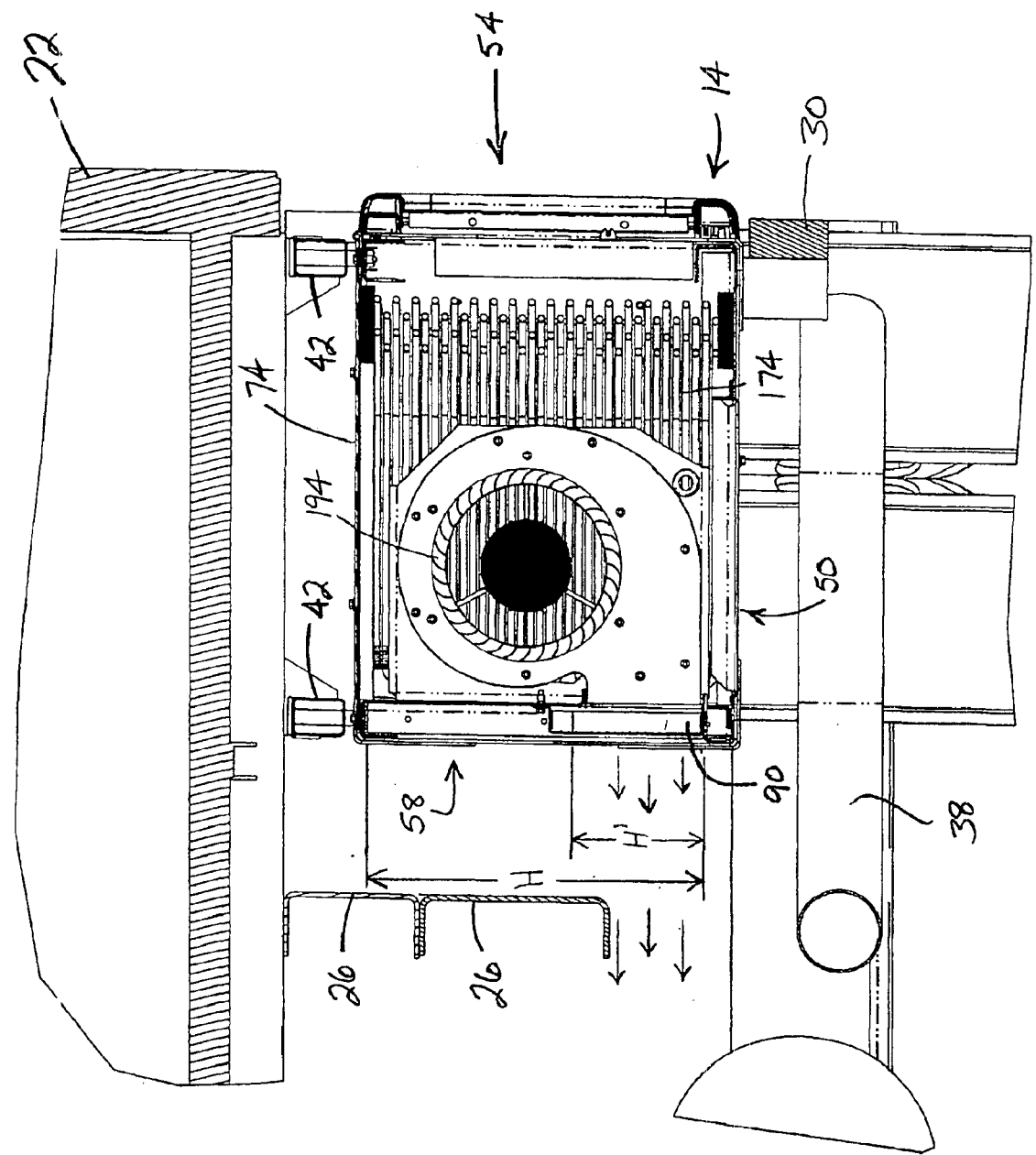
FIG. 6 is a section view taken along line 6—6 in FIG. 2, showing the air discharge pathway.

As best seen in FIGS. 2 and 6, the undermount temperature control unit 14, also referred to as a condenser module, is mounted underneath the box 22 on support members 42. In the illustrated embodiment, the undermount temperature control unit 14 hangs just above a portion of the guard rail 30. Of course, other methods of mounting the undermount temperature control unit 14 can also be used.

Referring now to FIGS. 3–6, the undermount temperature control unit 14 has a top 46, a bottom 50, a front side 54, a rear side 58 and left and right sides 62 and 66, respectively. The terms "top," "bottom," "front," "rear," "left," and "right" are used for purposes of description only and do not imply any particular orientation with respect to the vehicle 10. The unit 14 has a frame 70 (see FIG. 4) defining an interior space 72 that is at least partially closed on the bottom 50, the rear side 58, and the left and right sides 62 and 66. A top cover plate 74 (see FIGS. 3, 5, and 6) is fastened to the top of the frame 70 to enclose the top 46 of the unit 14. A rear cover plate 78 (see FIG. 5) is fastened to the rear of the frame 70 to close an access opening 82 (see FIG. 4) in the rear of the frame 70. Additionally, a discharge screen 86 (see FIG. 5) is fastened to the rear of the frame 70 to cover a discharge outlet 90 (see FIG. 6), which will be described in more detail below.

The unit 14 also includes a left side cover panel 94 coupled to the left side of the frame 70. The cover panel 94 includes a vent portion 98 that covers an air inlet opening 102 (see FIG. 4) in the left side of the frame 70. The vent portion 98 includes a hexagonal mesh or screen (only partially shown in the figures) covering substantially vertical louvers. The mesh and louvers help prevent dust and debris from entering the interior space 72 through the air inlet opening 102. Of course, the vent portion 98 need not include the louvers, and other meshes or screens could be substituted for the illustrated hexagonal mesh. The cover panel 94 also includes an opening 106 that provides access for the various electrical, water, and refrigerant connections 110 on the left side of the frame 70.

The unit 14 also includes a right side cover panel 114 (see FIG. 8) coupled to the right side of the frame 70. The cover panel 114 includes a vent portion 118 that covers an air inlet opening 122 (see FIG. 4) in the right side of the frame 70. The vent portion 118 also includes a hexagonal mesh or screen (only partially shown in the figures) covering substantially vertical louvers, as described above.

Figure 8:
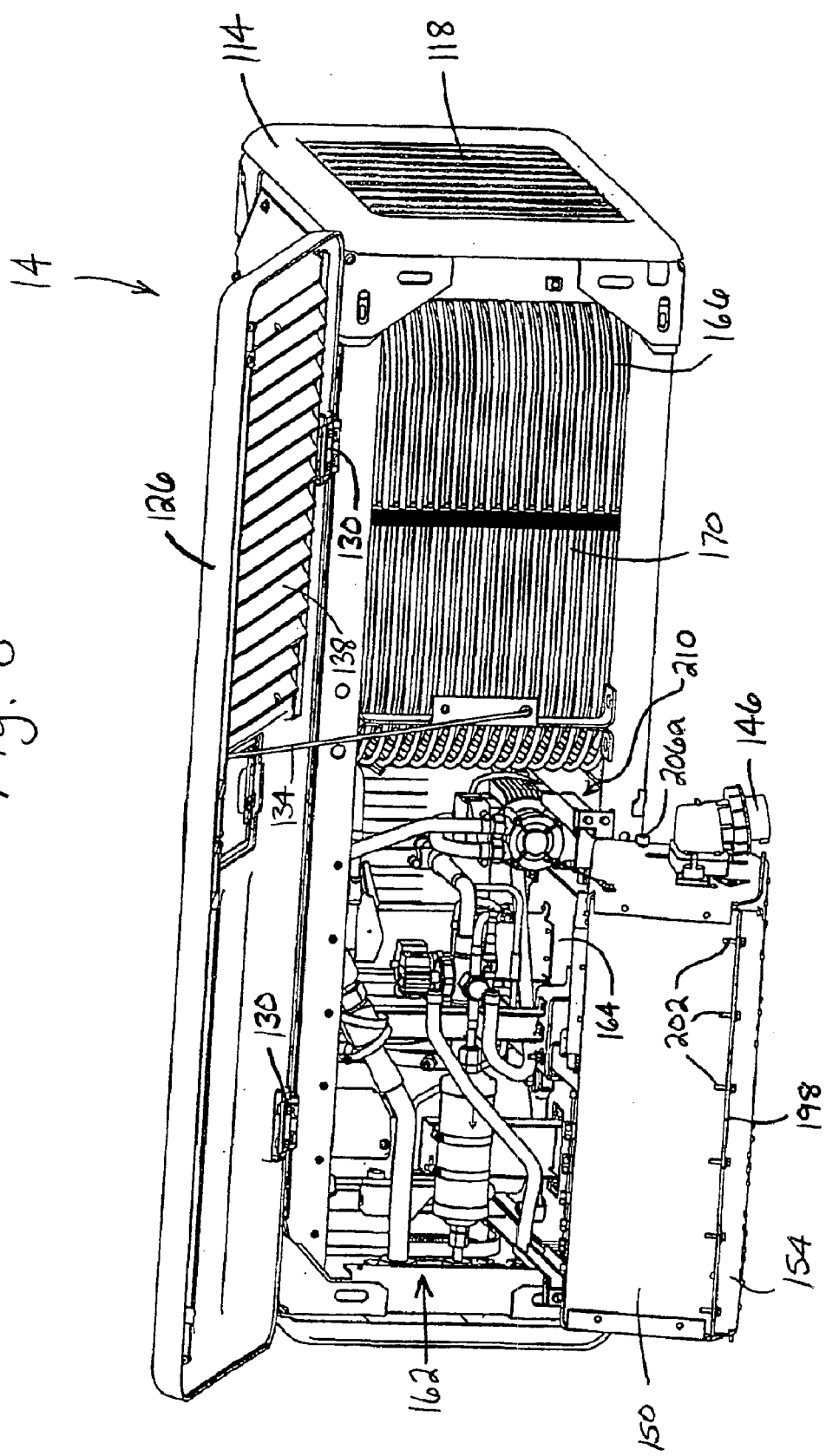
FIG. 8 is a front view of the undermount temperature control unit showing the access panel open and the control box partially removed from the unit to grant access to other components.

The unit 14 further includes a front access panel 126 hinged to the front side of the frame 70 at hinges 130. As seen in FIG. 8, the access panel 126 can be pivoted upwardly to provide access to the interior space 72 for cleaning and servicing the unit 14. A support member 134 coupled to the access panel 126 holds the access panel 126 in the open position. While the hinges are shown on the top of the frame 70, they could alternatively be on the bottom of the frame 70 so that the access panel 126 would pivot downwardly. Of course, other types of connections known to those skilled in the art can also be used to movably couple the access panel 126 to the frame 70. Alternatively, the access panel 126 could be completely removable from the unit 14.

As will be described in more detail below, the front access panel 126, in combination with several other features of the unit 14, provides ready access to virtually all of the key components housed in the interior space 72. This ready access from the front side 54 is highly advantageous since, as seen in FIG. 2, access to the rear 58, right 62, and left 66 sides of the undermount temperature control unit 14 is greatly limited by the wheels of the vehicle 10, the guard rail 30, the battery box 34, and the exhaust system 38.

Figure 3:
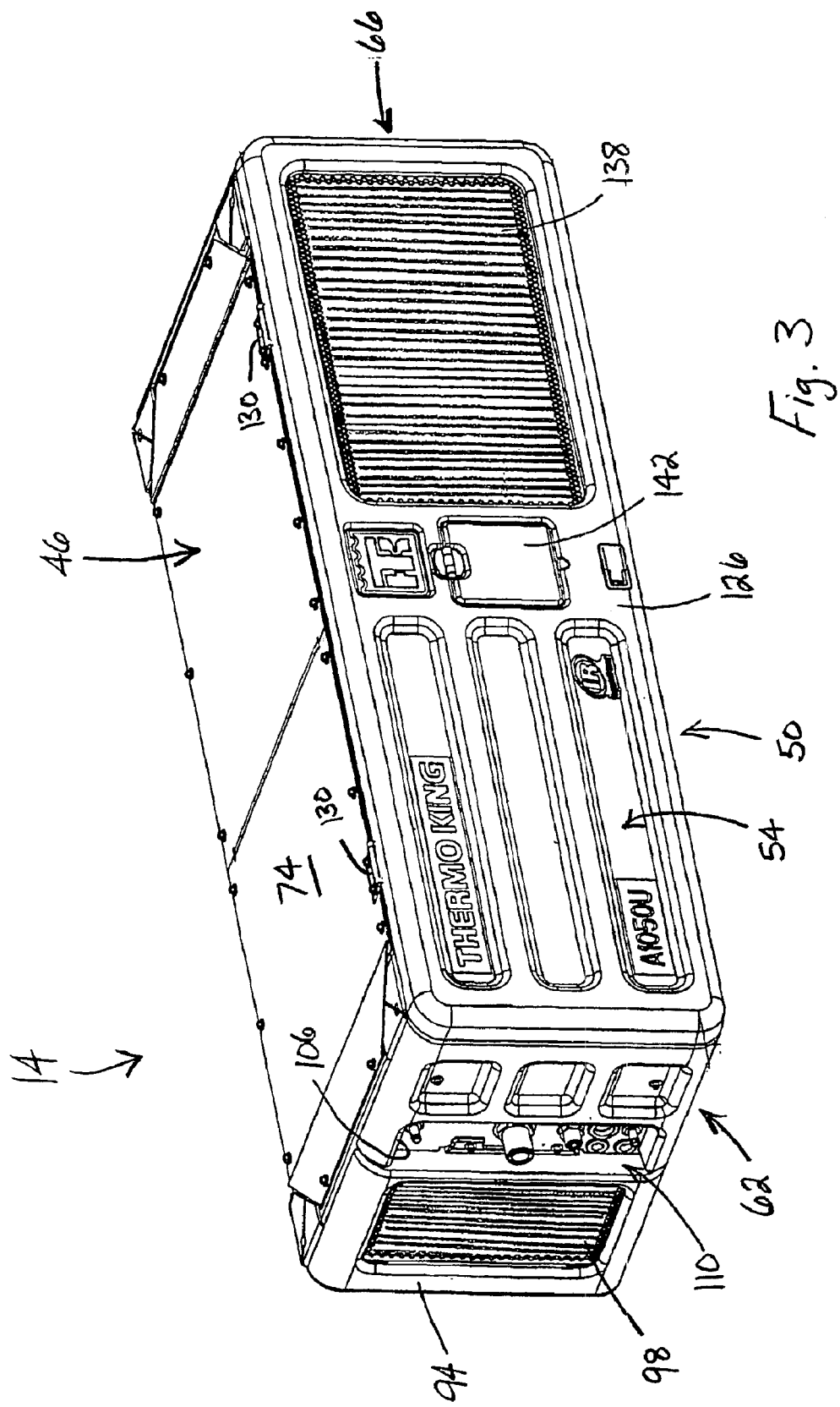
FIG. 3 is a perspective view of the undermount temperature control unit of FIG. 1, shown removed from the vehicle.

Referring to FIG. 3, the access panel 126 includes a vent portion 138 that allows air to enter the interior space 72. The vent portion 138 also includes a hexagonal mesh or screen (only partially shown in the figures) covering substantially vertical louvers, as described above. The access panel 126 also includes an access door 142 that can be opened independently of the access panel 126 to provide access to an electrical plug 146 (see FIG. 4). When the vehicle 10 is not running, the undermount temperature control unit 14 can be operated via an external power source (not shown) that is electrically connected to the plug 146. This is known as stand-by operation to those skilled in the art.

The undermount temperature control unit 14 is part of the refrigeration system used to condition the air in the box 22. The interior space 72 of the frame 70 houses a plurality of components that make up the refrigeration system. The illustrated unit 14 is electrically powered by an auxiliary alternator (not shown) that converts the mechanical power of the vehicle's engine to electricity, as is understood in the prior art. Powering the unit 14 electrically greatly reduces the size and weight of the unit 14 because no separate diesel engine is required. Additionally, no complicated and bulky system of belts and pulleys is needed to power the other components in the unit 14. Using electric power to run the unit 14 also reduces fuel consumption, noise, and vibration.

Figure 7:
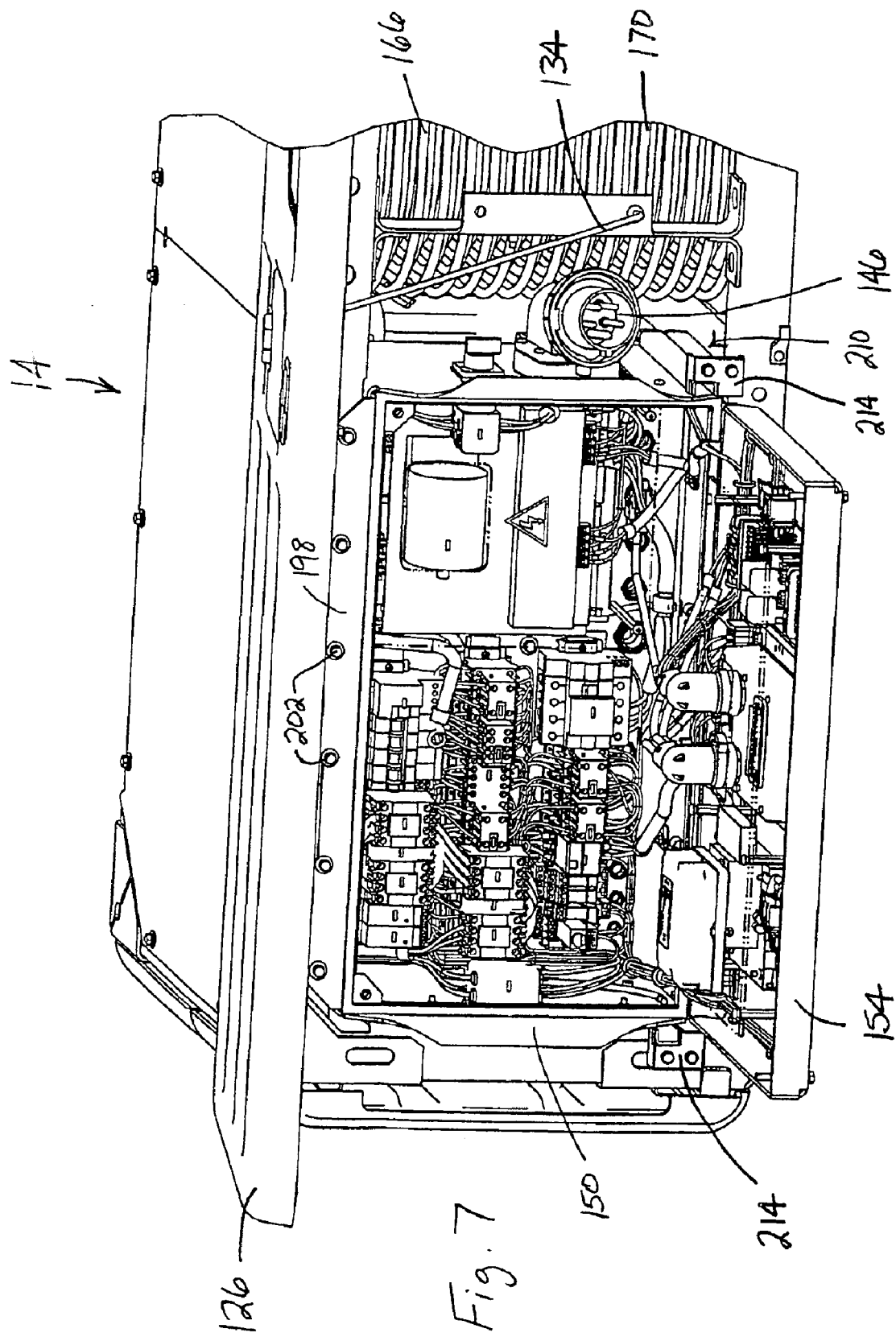
FIG. 7 is a partial front view of the undermount temperature control unit showing the access panel and the front cover of the control box open.

The electricity generated by the auxiliary alternator flows through an electrical control box 150 that, among other things, regulates the electric power with an inverter and distributes electricity to the other components housed in the interior space 72. In the illustrated embodiment, the control box is located in the front-left corner of the interior space 72, adjacent the front side 54 of the unit 14. As best seen in FIG. 7, the control box 150 includes a cover 154 that is movably coupled to the remainder of the control box 150. When the front access panel 126 is open, the cover 154 can be pivoted open on hinges 156 to grant access to the inside of the control box 150. Of course, the cover 154 can be movable or removable in other manners as well.

While the specific design of the control box 150 is not critical to the invention, the illustrated control box 150 is sealed and is externally cooled by circulated water coolant. One example of a suitable control box is described in commonly-assigned provisional patent application No. 60/217,990, filed Jul. 13, 2000.

Figure 4:
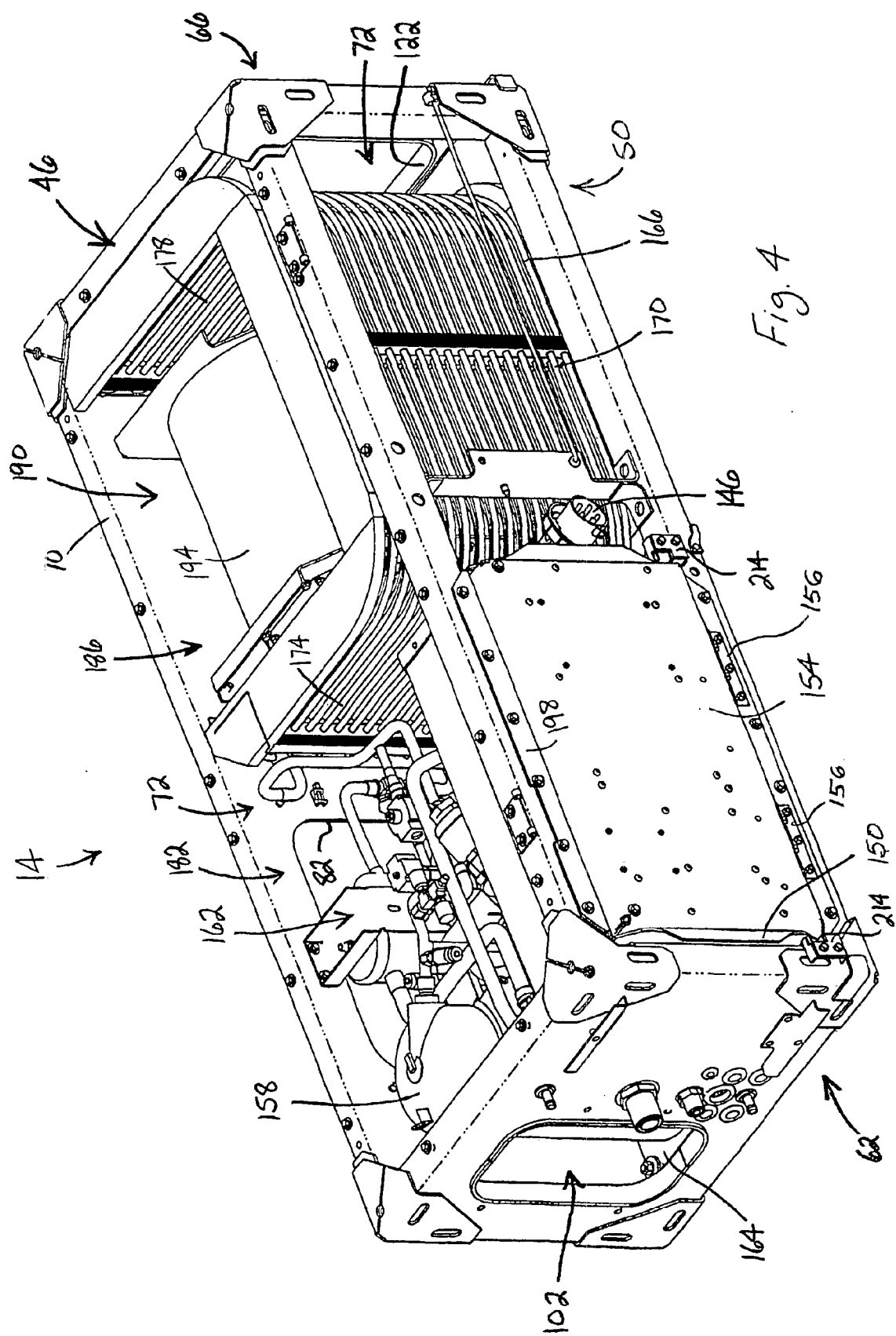
FIG. 4 is a perspective view of the undermount temperature control unit of FIG. 3, shown with the outer paneling removed.
Figure 5:
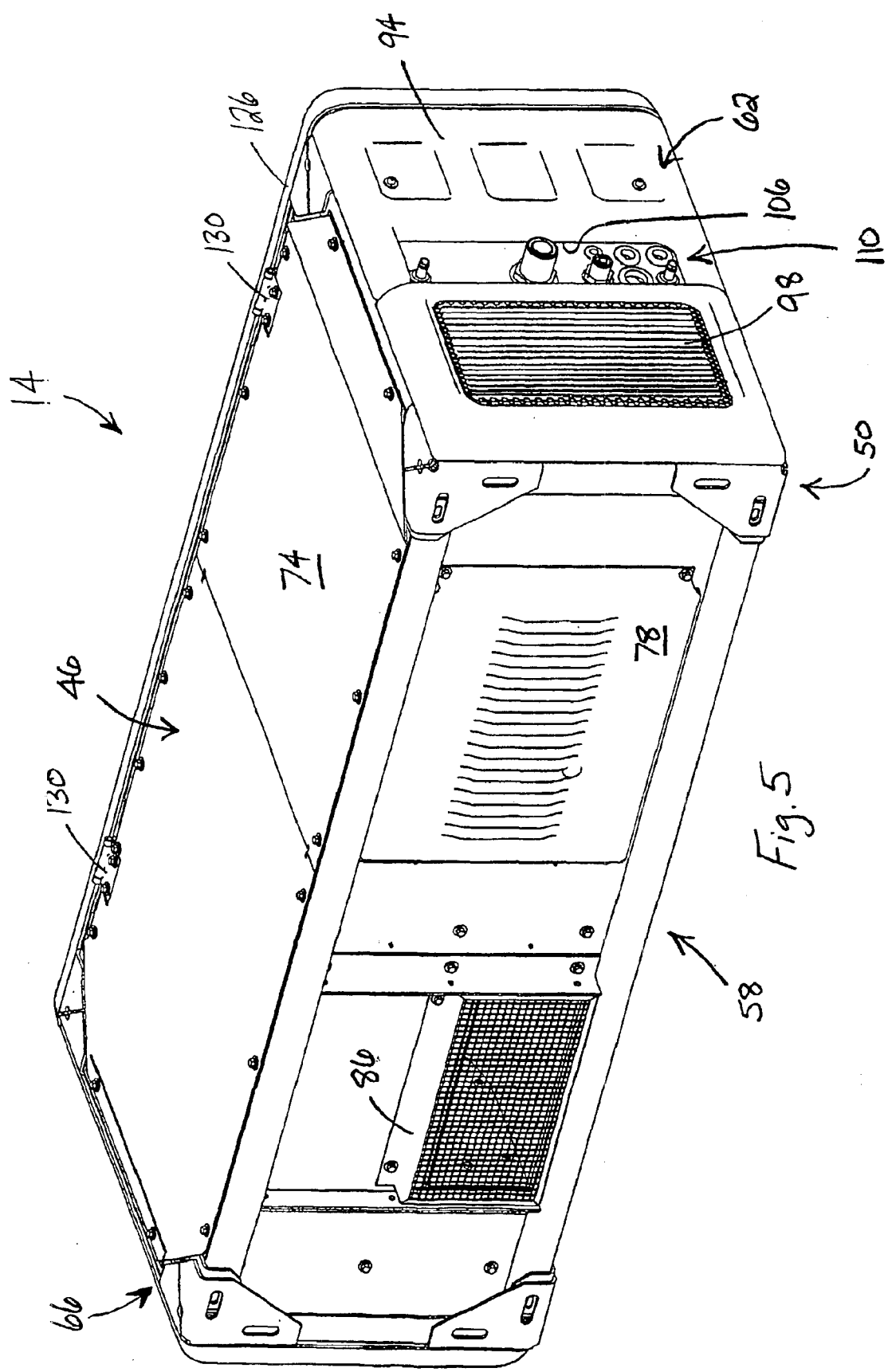
FIG. 5 is a perspective view showing the rear of the undermount temperature control unit of FIG. 3.

As best seen in FIG. 4, the control box 150 is electrically connected to a compressor 158, which is supported by the frame 70 in the rear-left corner of the interior space 72. The compressor 158 is preferably a hermetic scroll compressor having an integral electric motor inside the body of the compressor 158. The compressor 158 is smaller, lighter, quieter, and more efficient than the piston compressors normally used in conjunction with diesel-powered temperature control units. Additionally, the hermetic scroll compressor 158 is not prone to the refrigerant leakage that can occur through the shaft seal of a compressor driven by an external engine.

The discharge end of the compressor 158 communicates with a refrigerant routing system 162 that is supported by the frame 70 adjacent the compressor. While the specific design of the refrigerant routing system 162 is not critical to the invention, the illustrated refrigerant routing system 162 is a compact, modular unit having all of the conduits and components mounted on a single platform or bracket 164 (see FIGS. 4, 8, and 9) supported by the frame 70. The compressor 158 is also mounted on the platform 164 such that the compressor 158 and the refrigerant routing system 162 together define a single modular assembly that can be inserted or removed as a unit.

The outlet end of the refrigerant routing system 162 communicates with a condenser coil 166 that is also supported by the frame 70 in the interior space 72. Unlike prior-art flat condenser coils, the illustrated condenser coil 166 is substantially U-shaped and includes abase portion 170 adjacent the front side of the frame 70, and first and second arm portions 174 and 178 (see FIG. 4), respectively, that extend toward the rear side of the frame 70. In the illustrated embodiment, the first arm portion 174 substantially divides the interior space 72 into first and second portions 182 and 186, respectively, and the second arm portion is adjacent the right side of the frame 70. Together, the base portion 170 and the arm portions 174 and 178 define a second interior space 190 within the interior space 72.

An air displacement device, in the form of a radial blower 194 having an integral electric motor, is supported by the frame 70 in the second interior space 190. The blower 194 is electrically coupled to the control box 150 and helps move air through the second interior space 190 in order to cause the hot gaseous refrigerant in the condenser coil 166 to cool and return to liquid form. More specifically, air entering the interior space 72 through the air inlet openings 102 and 122 and through the vent portion 138 of the access panel 126 circulates through the condenser coil 166 to cool the hot gaseous refrigerant passing through the condenser coil 166. While not shown, the condenser coil 166 includes fins to facilitate cooling, as is understood by those skilled in the art. As the refrigerant is cooled, the air absorbs heat. In order to maintain the efficiency of the condensation process, the radial blower 194 discharges the heated air through the discharge outlet 90 in the rear of the frame 70.

The U-shaped configuration of the condenser coil 166 provides many advantages. First, the U-shaped condenser coil 166 occupies less distance along the front side of the frame 70, without sacrificing the capacity that would otherwise be achieved using a prior-art flat condenser coil extending across the entire front side of the frame 70. The arm portions 174 and 178 provide the added surface area needed to achieve the desired capacity, yet do so without blocking access to the components housed in the first portion 182 of the interior space 72, from the front side of the frame 70. The U-shaped condenser coil 166 and radial blower 194 arrangement also draws cooling air across the compressor 158, thereby increasing the efficiency of the compressor 158.

The compact configuration of the U-shaped condenser coil 166 also reduces the airflow needed to obtain the desired cooling capacity, which in turn reduces the required operating speed of the radial blower 194. The lower operating speed of the radial blower 194 reduces the overall power consumption as well as the noise and vibration emitted from the unit 14. Additionally, the radial blower 194 is smaller than the large axial fans used in the prior-art, making the undermount temperature control unit 14 more compact.

The radial blower 194 offers yet another advantage over the axial fans used in the prior art. Prior-art axial fans typically discharge air from the rear of the undermount temperature control unit along the entire height of the unit. This often results in large portions of the discharge air being obstructed by portions of the vehicle's frame. The obstructed air discharge reduces the overall capacity of the temperature control unit and increases the amount of dirt, dust, and other road debris that will be blown into and collected in the unit.

With the present invention, as best seen in FIG. 6, the majority of the air discharged from the discharge outlet 90 (represented by the arrows in FIG. 6) is unobstructed by the portion of the frame 26 supporting the box 22. This is because the discharge outlet 90 needed to accommodate the radial blower 194 need only extend upwardly approximately halfway from the bottom of the rear side 58. As shown in the illustrated embodiment, the rear side 58 has a height H and the discharge outlet 90 has a height H' that is less than or equal to half of the height H. Because the air exiting the discharge outlet 90 is substantially unobstructed by the frame 26, the capacity of the condenser coil 166 is increased and the amount of dirt, dust, and other blowing road debris is minimized.

As mentioned above, the access panel 126 can be opened to provide access to the majority of the components (all except the radial blower 194) housed within the frame 70. As seen in FIG. 7, access to the control box 150 is gained by opening the access panel 126 and the cover 154. Again, this easy access to the control box 150 is possible because of the compact, U-shaped configuration of the condenser coil 166, which takes up less space along the front side 54 of the frame 70.

To gain access to the compressor 158 and the refrigerant routing system 162, the control box 150 is movable from a first position, where the control box 150 is inside the interior space 72 and positioned for operation of the temperature control unit 14, to a second position, where the control box 150 is at least partially outside the interior space 72 and positioned to grant access the compressor 158 and the refrigerant routing system 162 from the front side 54 of the frame 70. FIGS. 8–11 illustrate this movement of the control box 150, which will be described in greater detail below.

As seen in FIGS. 7, 8, 10, and 11, the control box 150 includes a flange 198 that is removably secured to the front side 54 of the frame 70 with fasteners 202. Of course other methods of securing the control box 150 to the frame 70 could also be used. When the fasteners 202 are removed, the control box 150 is movable with respect to the frame 70 as shown in FIGS. 10 and 11. From inside the interior space 72, the control box 150 is moved substantially linearly, out of the frame 70 to the position shown in phantom lines in FIGS. 10 and 11. Next, the control box 150 is pivoted downwardly to the position shown in solid lines outside of the frame 70 in FIGS. 10 and 11, and as shown in FIGS. 8 and 9. As best seen in FIGS. 8 and 9, when the control box 150 is pivoted downwardly, the operator has access to the compressor 158 and the refrigerant routing system 162 for servicing and cleaning.

In the illustrated embodiment, each side of the control box 150 includes a plurality of rollers 206 positioned to roll in one of two rail assemblies 210 coupled to the frame 70. The rail and roller system on each side of the control box 150 is substantially mirror images of one another and only one will be described in detail. As best seen in FIGS. 10 and 11, upper rollers 206a roll in an upper rail 210a, while a lower roller 206b rolls in a lower rail 210b. As the control box 150 is rolled out of the interior space 72, the upper rollers 206a are free to exit the upper rail 210a. The lower roller 206b, on the other hand, is prevented from exiting the lower rail 210b by a stop member 214 (see FIG. 9). The stop member 214 functions to keep the control box 150 coupled to the frame and acts as a pivot point about which the control box 150 pivots downwardly, as shown in FIGS. 9–11.

After the unit 14 has been serviced or cleaned, the operator pivots the control box 150 up to the position shown in phantom lines in FIGS. 10 and 11 and aligns the upper rollers 206a with the upper rail 210a so that the control box 150 can be rolled back into the interior space 72. The control box 150 is rolled into the frame 70 until the flange 198 abuts the front side 54. The fasteners 202 are then fastened to secure the control box 150 in the operating position.

While the illustrated embodiment utilizes the rail and roller system described above, those skilled in the art would understand that the linear movement of the control box 150 could be achieved in other ways. For example, various sliding guide rail systems, rack and pinion systems, or other similar systems could be substituted for the illustrated rail and roller system. It should also be noted that the control box 150 could be pivoted upwardly instead of downwardly to gain access to the interior space 72. However, such upward pivoting would be more difficult due to the illustrated manner in which the access panel 126 is opened, and in light of the added parts that would be required to hold the control box 150 in the upwardly-pivoted position.

Various features of the invention are set forth in the following claims.

What is claimed is:

1. A condenser module for a temperature control unit of a transport vehicle, the condenser module comprising:
    a frame having a first side and a second side opposite the first side, the frame defining an interior space;
    a compressor supported by the frame in the interior space;
    a refrigerant routing system communicating with the compressor and supported by the frame in the interior space;
    a substantially U-shaped condenser coil communicating with the refrigerant routing system and supported by the frame in the interior space, at least a portion of the condenser coil being positioned adjacent to the first side;
    a control box for providing electric power to the temperature control unit, at least a portion of the control box being supported by the frame in the interior space and being positioned adjacent to the first side; and
    an access panel movably coupled to the first side of the frame for granting access to the condenser coil and the control box.

2. The condenser module of claim 1, wherein the U-shaped condenser coil includes a base portion adjacent the first side of the frame, and first and second arm portions extending toward the second side of the frame, the base portion and the arm portions together defining a second interior space within the interior space defined by the frame.

3. The condenser module of claim 2, wherein the first arm portion substantially divides the interior space of the frame into first and second portions.

4. The condenser module of claim 3, wherein at least a portion of the air passing through the first arm portion is pulled from the first portion of the interior space where the compressor is located.

5. The condenser module of claim 2, further including an air displacement device in the second interior space for moving air through the second interior space.

6. The condenser module of claim 5, wherein the air displacement device is a radial blower.

7. The condenser module of claim 5, wherein the second side of the frame includes an outlet adjacent the second interior space for exhausting air displaced by the air displacement device.

8. The condenser module of claim 7, wherein the second side of the frame has a height, and wherein the outlet has a height less than the height of the second side.

9. The condenser module of claim 8, wherein the height of the outlet is approximately half the height of the second side.

10. The condenser module of claim 7, wherein the second side has a top and a bottom, and wherein the outlet is adjacent the bottom and extends approximately halfway toward the top.

11. A condenser module for a temperature control unit of a transport vehicle, the condenser module comprising:
   a frame having a first side and a second side opposite the first side, the frame defining an interior space;
   an access panel movably coupled to the first side of the frame for granting access to the interior space;
   a compressor supported by the frame in the interior space;
   a refrigerant routing system communicating with the compressor and supported by the frame in the interior space;
   a substantially U-shaped condenser coil communicating with the refrigerant routing system and supported by the frame in the interior space; and
   a control box adjacent the first side for providing electric power to the temperature control unit;
   wherein the control box is movably coupled to the frame and is movable between a first position, where the control box is inside the interior space and positioned for operation of the temperature control unit, and a second position, where the control box is at least partially outside the interior space and positioned to grant access to the refrigerant routing system and the compressor from the first side of the frame.

12. The condenser module of claim 11, wherein the control box moves between the first and second positions by rolling with respect to the frame.

13. The condenser module of claim 11, wherein the control box moves between the first and second positions by pivoting with respect to the frame.

14. The condenser module of claim 1, wherein the access panel is pivotable with respect to the control box.

15. The condenser module of claim 1, wherein the compressor and the refrigerant system are both mounted on a platform such that the compressor and the refrigerant routing system together define a single modular assembly.

16. A condenser module for a temperature control unit of a transport vehicle, the condenser module comprising:
   a frame having a first side and a second side opposite the first side, the frame defining an interior space;
   an access panel movably coupled to the first side of the frame for granting access to the interior space;
   a compressor supported by the frame in the interior space adjacent the second side;
   a refrigerant routing system communicating with the compressor and supported by the frame in the interior space adjacent the second side;
   a condenser coil communicating with the refrigerant routing system and supported by the frame in the interior space; and
   a control box adjacent the first side for providing electric power to the temperature control unit, the control box being movably coupled to the frame and movable between a first position, where the control box is inside the interior space and positioned for operation of the temperature control unit, and a second position, where the control box is at least partially outside the interior space and positioned to grant access to the refrigerant routing system and the compressor from the first side of the frame.

17. The condenser module of claim 16, wherein the control box moves linearly between the first and second positions.

18. The condenser module of claim 16, wherein the control box pivots between the first and second positions.

19. The condenser module of claim 16, wherein the control box includes a cover that can be removed to grant access to the inside of the control box.

20. The condenser module of claim 19, wherein the cover is pivotable with respect to the control box.

21. The condenser module of claim 16, wherein the compressor and the refrigerant system are both mounted on a platform such that the compressor and the refrigerant routing system together define a single modular assembly.

22. A method of gaining access to components housed in an interior space of a condenser module of a temperature control unit, the condenser module having a frame with first and second sides, and a control box movably coupled to the frame adjacent the first side, the components including a compressor supported by the frame in the interior space adjacent the second side and a refrigerant routing system communicating with the compressor and supported by the frame in the interior space adjacent the second side, the method comprising:
   moving the control box from a first position, where the control box is inside the interior space and positioned for operation of the temperature control unit, to a second position, where the control box is at least partially outside the interior space and positioned to allow access to the refrigerant routing system and the compressor from the first side of the frame.

23. The method of claim 22, wherein the condenser module further includes an access panel movably coupled to the first side of the frame, and wherein the method further includes opening the access panel to gain access to the interior space from the first side.

24. The method of claim 23, wherein opening the access panel includes pivoting the access panel with respect to the frame.

25. The method of claim 22, wherein moving the control box includes moving the control box linearly between the first and second positions.

26. The method of claim 22, wherein moving the control box includes pivoting the control box between the first and second positions.

27. The method of claim 22, wherein moving the control box includes rolling the control box out of the interior space and subsequently pivoting the control box so that at least a portion of the control box moves away from the first side of the frame.

28. The method of claim 27, further including releasing a fastener that secures the control box in the first position prior to rolling the control box out of the interior space.

* * * * *